(12) United States Patent
Link et al.

(10) Patent No.: US 9,321,070 B2
(45) Date of Patent: Apr. 26, 2016

(54) METHOD AND DEVICE FOR PRECIPITATING OVERSPRAY AND INSTALLATION PROVIDED THEREWITH

(75) Inventors: Kersten Link, Grafenau (DE); Juergen Roeckle, Magstadt (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/235,221

(22) PCT Filed: Jul. 13, 2012

(86) PCT No.: PCT/EP2012/002948
§ 371 (c)(1),
(2), (4) Date: Mar. 10, 2014

(87) PCT Pub. No.: WO2013/013780
PCT Pub. Date: Jan. 31, 2013

(65) Prior Publication Data
US 2014/0202332 A1    Jul. 24, 2014

(30) Foreign Application Priority Data

Jul. 27, 2011 (DE) .......................... 10 2011 108 631

(51) Int. Cl.
*B01D 46/00* (2006.01)
*B05B 15/12* (2006.01)
*B01D 45/08* (2006.01)

(52) U.S. Cl.
CPC ............. *B05B 15/1248* (2013.01); *B01D 45/08* (2013.01); *Y02P 70/36* (2015.11)

(58) Field of Classification Search
CPC .. B01D 46/002; B01D 46/0068; B01D 46/10; B01D 46/48; B01D 46/521; B05B 15/1248; B05B 15/1251; B05B 15/1288; Y10S 55/46

USPC .............. 95/279; 55/356, 422, 430, 472, 481, 55/504, DIG. 46; 454/53; 118/326
See application file for complete search history.

(56) References Cited

U.S. PATENT DOCUMENTS

| | | | |
|---|---|---|---|
| 3,932,151 A | 1/1976 | Lau | |
| 4,401,445 A | * 8/1983 | Browning | ........................ 95/279 |
| 5,279,631 A | * 1/1994 | Pingel | ............................ 55/294 |
| 7,309,369 B2 | 12/2007 | Eder | |
| 8,961,642 B2 | * 2/2015 | Holler et al. | .................... 55/482 |
| 2005/0229560 A1 | 10/2005 | Eder | |

FOREIGN PATENT DOCUMENTS

| | | |
|---|---|---|
| DE | 25 52 326 A1 | 5/1977 |
| DE | 199 30 709 A1 | 1/2001 |

(Continued)

*Primary Examiner* — Duane Smith
*Assistant Examiner* — Minh-Chau Pham
(74) *Attorney, Agent, or Firm* — Factor Intellectual Property Law Group, Ltd.

(57) ABSTRACT

A method for precipitating overspray from the overspray-laden booth exhaust air of coating installations, in particular from painting installations, the overspray is carried by an air stream to a precipitation device, where a majority at least of the solid material is precipitated from the overspray. The overspray-laden booth exhaust air is guided through filter modules, in which overspray is precipitated and which are designed as replaceable one-way components having a filter housing and a filter unit, wherein each filter module is replaced by an empty filter module after reaching a loading overspray. Moreover, the invention relates to a device for precipitating overspray by means of such one-way filter modules, and to an installation for coating objects, in particular vehicle bodies.

16 Claims, 7 Drawing Sheets

(56) References Cited

FOREIGN PATENT DOCUMENTS

| DE | 201 09 800 U1 | 9/2001 |
| DE | 20 2005 013 403 U1 | 12/2005 |
| DE | 10 2007 041 008 A1 | 3/2009 |
| WO | 03/084638 A2 | 10/2003 |

* cited by examiner

METHOD AND DEVICE FOR PRECIPITATING OVERSPRAY AND INSTALLATION PROVIDED THEREWITH

RELATED APPLICATIONS

This application is a national phase of International Patent Application No. PCT/EP2012/002948, filed Jul. 13, 2012, which claims the filing benefit of German Patent Application No. 10 2011 108 631.9, filed Jul. 27, 2011, the contents of both of which are incorporated herein by reference.

FIELD OF THE INVENTION

The invention relates to a method for separating overspray from the overspray-laden booth air of coating plants, in particular of painting plants, in which the overspray is taken up by an air stream and guided to a separating device where a majority at least of the solid materials is separated from the overspray.

The invention moreover relates to a device for separating overspray from the overspray-laden booth air of coating plants, in particular of painting plants.

The invention is furthermore concerned with a plant for coating, in particular for painting, objects, in particular vehicle bodies, having
a) a coating booth, in which the objects can be acted upon by coating material and through which an air stream can be conducted, which takes up and carries away the overspray produced from the coating material;
b) a separating device to which this booth air can be supplied and where a majority at least of the solid materials is separated from the overspray.

BACKGROUND OF THE INVENTION

When paints are applied manually or automatically to objects, a substream of the paint, which generally contains both solid bodies and/or binding agents as well as solvents, is not applied to the object. This substream is known amongst experts as "overspray". The terms overspray, overspray particles or overspray solids will always be used below to refer to a disperse system, such as an emulsion or suspension or a combination thereof. The overspray is taken up by the air stream in the paint booth and supplied for separation so that, if required, the air can be conducted back to the coating booth after suitable conditioning.

Particularly in plants with a relatively high paint consumption, for example in plants for painting vehicle bodies, wet separation systems are preferably used. In commercially known wet separators, water flows together with the booth exhaust air coming from above to a nozzle accelerating the air stream. A swirling of the through-flowing booth exhaust air with the water takes place in this nozzle. In this procedure, the overspray particles pass largely into the water so that the air exiting the wet separator has been substantially cleaned and the paint overspray particles reside detackified in the water. They can then be recovered from this or disposed of.

In known wet separators, a relatively high amount of energy is used to circulate the very large quantities of water required. Treating the rinsing water is costly due to the elevated use of paint-binding and detackifying chemicals and the disposal of paint sludge. Furthermore, owing to the intensive contact with the rinsing water, the air absorbs a high amount of moisture which, in recirculating-air mode, in turn results in a high energy consumption for treating the air.

In contrast, in commercially known devices of the type mentioned at the outset, a dry separation process is used. Particularly established in this regard are electrostatically operating separators in which the paint overspray is guided past a separating surface and separated there due to the overspray particles being ionised by an electrode device and migrating to the separating surface as a result of the electrical field established between the separating surface and the electrode device. The paint overspray particles adhering to the separating surface can then be stripped from this, for example mechanically, and transported away.

The cleaning effect of such separators is indeed very good. However, for continuous operation, it must always be ensured that a sufficiently strong electrical field can be established between the separating surface and the electrode device, which is only possible up to a certain thickness of the paint overspray layer on the separating surface since such a layer has an insulating effect. However, the necessary continuous removal of the paint overspray from the separating surface is associated with high structural costs and can be prone to faults. Overspray may moreover react, harden or dry on the separating surface so that it can no longer be removed by simply being stripped from the separating surface. The energy costs for such separators are moreover relatively high.

An object of the present invention, therefore, is to provide a method, a separating device and a plant of the type mentioned at the outset, which take these problems into account.

SUMMARY OF THE INVENTION

This object may be achieved in a method of the type mentioned at the outset in that
the overspray-laden booth air is conducted through filter modules in which overspray is separated and which are constructed as replaceable disposable components with a filter housing and a filter unit, wherein each filter module is replaced with an empty filter module after reaching an overspray loading limit.

The invention is based on the awareness that, contrary to common opinion, disposable filter modules are economical and moreover environmentally friendly. In terms of energy, and also in terms of the necessary resources, treating and/or disposing of such disposable filter modules is more favourable than the expenditure on a separating device in which the separated paint is removed from existing separating surfaces in a continuous process.

For these reasons, it is therefore favourable if a replaced, overspray-laden filter module is supplied to a disposal and/or recycling process.

It has been shown to be particularly effective if an inertial filter is used as the filter unit. An inertial filter can be advantageously operated without an external energy supply and results in effective separation of overspray.

With regard to a separating device of the type mentioned at the outset, the above-mentioned object may be achieved in that
a) the separating device operates using filter modules through which overspray-laden booth air can be conducted and in which overspray is separated;
b) the filter modules are constructed as replaceable disposable components with a filter housing and a filter unit;
c) the separating device comprises means by which each filter module can be replaced with an empty filter module after reaching an overspray loading limit.

The advantages correspond to the advantages explained above in relation to the method.

It is analogously favourable if the filter unit is constructed as an inertial filter.

To achieve a good separating effect, it is particularly advantageous here if the filter unit comprises a plurality of separating elements which are arranged so as to form a flow labyrinth.

The separating elements preferably extend vertically and have booth air flowing around them in a horizontal direction. The overspray can then flow downwards to the separating elements.

If the spacing between the separating elements decreases in the flow direction and/or in a direction which is perpendicular to the flow direction, overspray particles which are still present in the booth air at the end of the flow path through the filter unit are also separated effectively.

In practice, filter plates, filter cartridges, compartment structures or chamber structures have proven to be favourable separating elements.

If a filter module comprises a base part constructed as a standardised supporting structure, it can be conveyed by means of known conveyor systems which are already adapted to standardised supporting structures of this type.

In terms of the treatment or disposal of the disposable filter module, it is particularly advantageous if one component, several components or all components of the filter module are made from a wet-strength recycling material.

One or more of the following materials is preferably selected as a wet-strength recycling material here: paper and paperboard materials, corrugated cardboard, cardboards with vertical corrugations, cardboards with a honeycomb structure or cardboard wrap, MDF material, wood. Plastic materials, in particular such as polyethylene or polypropylene, are also suitable.

It can be advantageous if the filter module is constructed as a modular kit. In this case, a filter module can be assembled on site and can be transported in space-saving manner, e.g. folded flat, to its place of use.

To capture separated overspray effectively, it is favourable if the filter module comprises a collecting trough in which separated overspray collects.

The colleting trough can comprise for example a collecting bag which is arranged on the base of the filter module.

The above-mentioned object may now be achieved in a plant of the type mentioned at the outset in that it comprises a separating device with some or all of the above-mentioned features.

The advantages which can be achieved thereby correspond to the advantages explained above in relation to the separating device.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
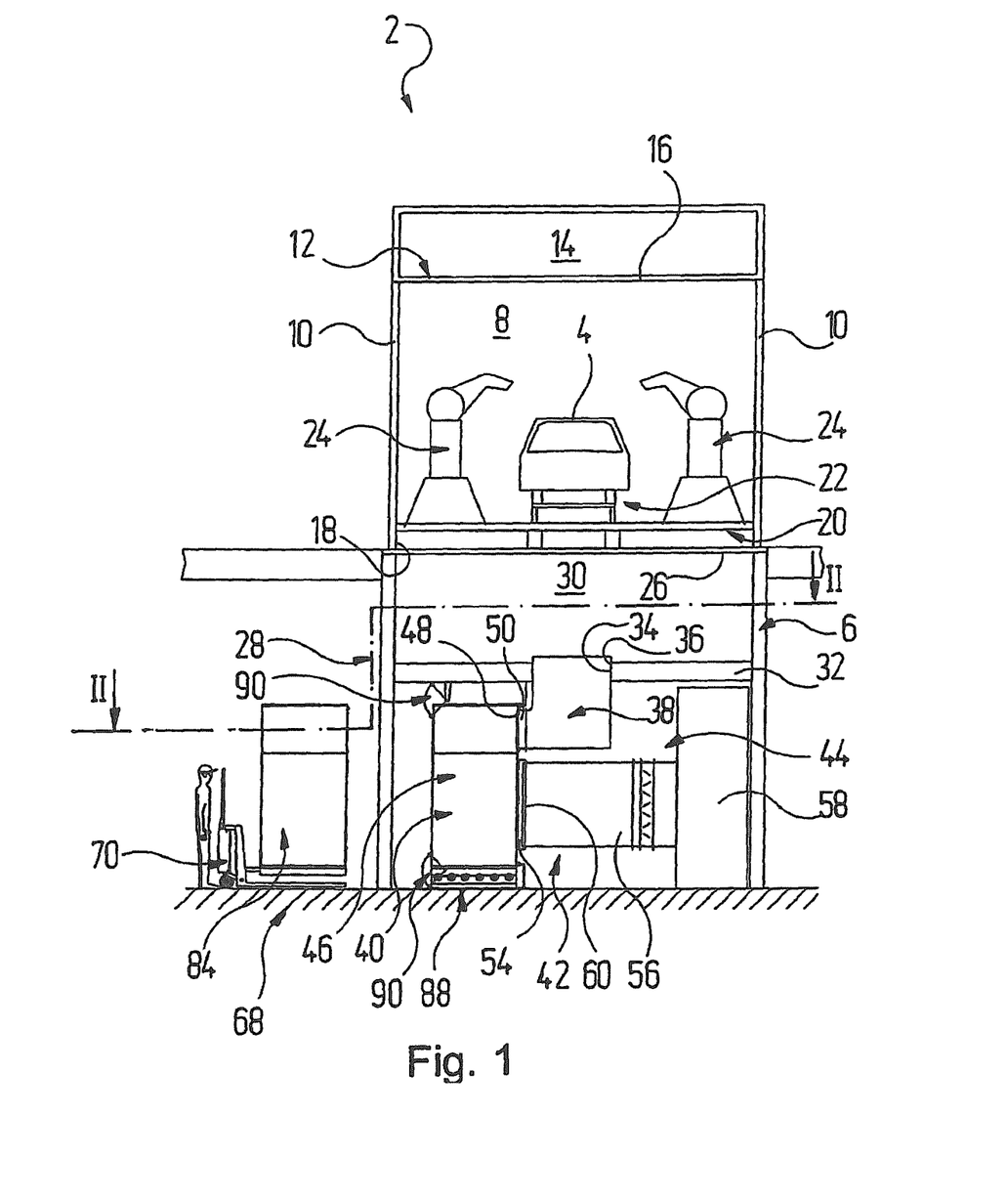
FIG. 1 a paint booth of a surface treatment plant with a separating device for overspray in a front view.

In FIG. 1, 2 denotes a paint booth, as a whole, of a surface treatment plant in which vehicle bodies 4 are painted after they have been cleaned and degreased, for example, in the pre-treatment stations which are located upstream in the paint booth 2 and are not shown specifically. The paint booth 2 rests on a steel construction 6 as is known per se.

The paint booth 2 comprises a paint tunnel 8, which is arranged at the top and is delimited by vertical side walls 10 and a horizontal booth ceiling 12, but is open at the end faces. Moreover, the paint tunnel 8 is open to the bottom in such a way that overspray-laden booth air can flow downwards. The booth ceiling 12 is constructed in conventional manner as a lower delimitation of an air supply chamber 14 with a filter cover 16.

Arranged above a lower opening 18 of the paint tunnel 8, there is a steel framework 20 which supports conveying technology 22 which is known per se and is not discussed in more detail here. This can be used to transport vehicle bodies 4 to be painted from the entry side of the paint tunnel 8 to its exit side.

Located inside the paint tunnel 8 are application devices in the form of multi-axle application robots 24, which are known per se. The vehicle bodies 4 can be coated with paint by means of the application robots 24.

The lower opening 18 of the paint tunnel 8 is covered by an accessible grating 26. Located beneath the grating 26, there is a plant region 28 in which the overspray particles entrained by the booth air are separated from the booth air.

Therefore, air flows out of the air supply chamber 14 downwards through the paint tunnel 8 to the plant region 28, whereby paint overspray which is present in the paint tunnel 8 is taken up and entrained by the air.

The plant region 28 comprises a flow region 30 into which the overspray-laden booth air flows first and which, to this end, is open at the top towards the paint booth 2, but delimited at the side by the side walls 10 and at the bottom by an intermediate ceiling 32. The intermediate ceiling 32 has a plurality of passages 34 arranged in succession in the longitudinal direction of the booth. Each of these passages 34 leads to a channel inlet 36 of a respective air guide channel 38 into which the booth air which is laden with overspray particles firstly flows by and large vertically downwards.

The air guide channel 38 then deflects the booth air through 90° into the horizontal, whereupon it then flows into a filter module 40 in a by and large horizontal direction. Each filter module 40 forms a separating unit which operates with a separating device denoted as a whole by 42, which is present in a separating region 44 of the paint booth 2 which is arranged below the flow region 30.

Each filter module 40 is detachably connected to one of the air guide channels 38. To this end, each filter module 40 has a filter housing 46 with a filter inlet 48 which is constructed complementarily to a channel outlet connection 50 of the air guide channel 38 so that the filter module 40 can be fluidically connected to, or disconnected from, the channel outlet connection 50 of the air guide channel 38 by a corresponding horizontal movement.

The separating device 42 in the present exemplary embodiment is therefore a separating filter which is assembled in modular fashion from the filter modules 40.

The booth air is deflected twice more through 90° in the filter module 40, then flows through a filter unit in the form of an inertial filter 52 on which the paint overspray separates, and exits the filter module 40 through a filter outlet connection 54 on the same side of the filter housing 46 as that on which the filter inlet 48 is located. From there, the booth air, which is now substantially free of overspray particles, flows into an intermediate channel 56 by way of which it arrives in a collecting flow channel 58.

The intermediate channel 56 has an inlet flange 60, it being possible for the filter outlet connection 54 of the filter module 40 to be fluidically connected to, or disconnected from, this inlet flange 60 through its horizontal movement described above. A filter module 40 is therefore ready for use in an operating position when its filter inlet 48 is connected to the channel outlet connection 50 of the air guide channel 38 and its filter outlet connection 54 is connected to the inlet flange 60 of the intermediate channel 56.

The booth air is supplied for further treatment and conditioning by way of the collecting flow channel 58 and is subsequently conducted in a circuit (not shown specifically here) back into the air supply chamber 14 from which it flows back into the paint tunnel 8 from above. In the event that the booth air has not yet been adequately freed of overspray particles by the separating filter 42, further filter stages can be provided downstream of the separating filter 42, to which the booth air is supplied and in which fleece filters or electrostatically operating separating filters are used, as are known per se. It is also optionally possible to integrate one or more of such filter stages in the filter module 40. A filter fleece can therefore be arranged for example upstream of the filter outlet connection 54.

Figure 3:
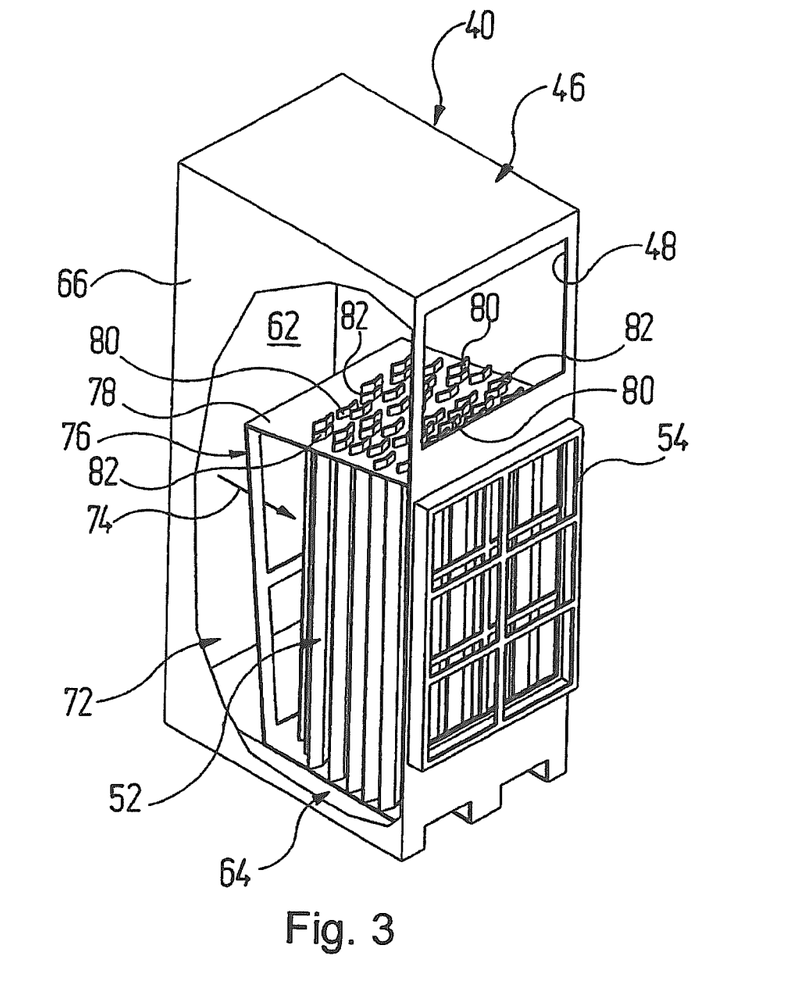
FIG. 3 a perspective view of a filter module of the separating device, wherein part of a filter housing is shown broken away.

One of the filter modules 40 is now explained in more detail with reference to FIG. 3. As can be seen therein, the filter housing 46 of the filter module 40 delimits a flow chamber 62 which extends between the filter inlet 48 and the filter outlet connection 54 and through which the booth air flows on a flow path which is curved through 180°.

The filter housing 46 in turn comprises a base part 64 and a chamber cover 66 which is supported by the base part 64 and in which a chamber wall has the filter inlet 48 and the filter outlet connection 54. In terms of its geometry and its dimensions, the base part 64 is constructed as a standardised supporting structure and for example in accordance with a with a so-called Euro pallet. It is thus possible for a filter module 40 to be moved by a conveyor system 68 adapted to such standard structures and to be brought into, or removed from, its operating position. This is indicated in FIG. 1 using the example of an elevating conveyor truck 70 which can be operated manually by an operator.

The arrangement of the filter modules 40 in the separating region 44 of the paint booth 2 can take place accordingly in grid formation, which rests on the standardised base part 64 used.

At least a lower collecting region of the filter module 40 is liquid-tight and therefore designed as a collecting trough 72 for paint which is separated at the inertial filter 52 and flows downwards therein.

The inertial filter 52 is arranged upstream of the filter outlet connection 54 in the flow chamber 62 in such a way that the overspray-laden booth air flows through it in a horizontal direction 74. The inertial filter 52 comprises a supporting structure 76 with a substantially horizontal supporting plate 78—as shown in FIG. 3, the supporting plate 78 here is angled slightly downwards with respect to the horizontal in the flow direction of the booth air entering the filter module 40—which is mounted inside on the housing wall of the filter housing 46 with the filter inlet 48 and the filter outlet connection 54.

The supporting plate 78 supports a plurality of filter plates 80 which serve as separating elements and extend downwards in the direction of the collecting trough 72 and of which only a few are provided with a reference numeral for the sake of clarity. As in the present exemplary embodiment, this can be implemented for example in such a way that the supporting plate 78 has slots 82 which are complementary to the filter plates 80 and in which the filter plates 80 are inserted. Of the slots 82, again only a few have a reference numeral.

Figure 2:
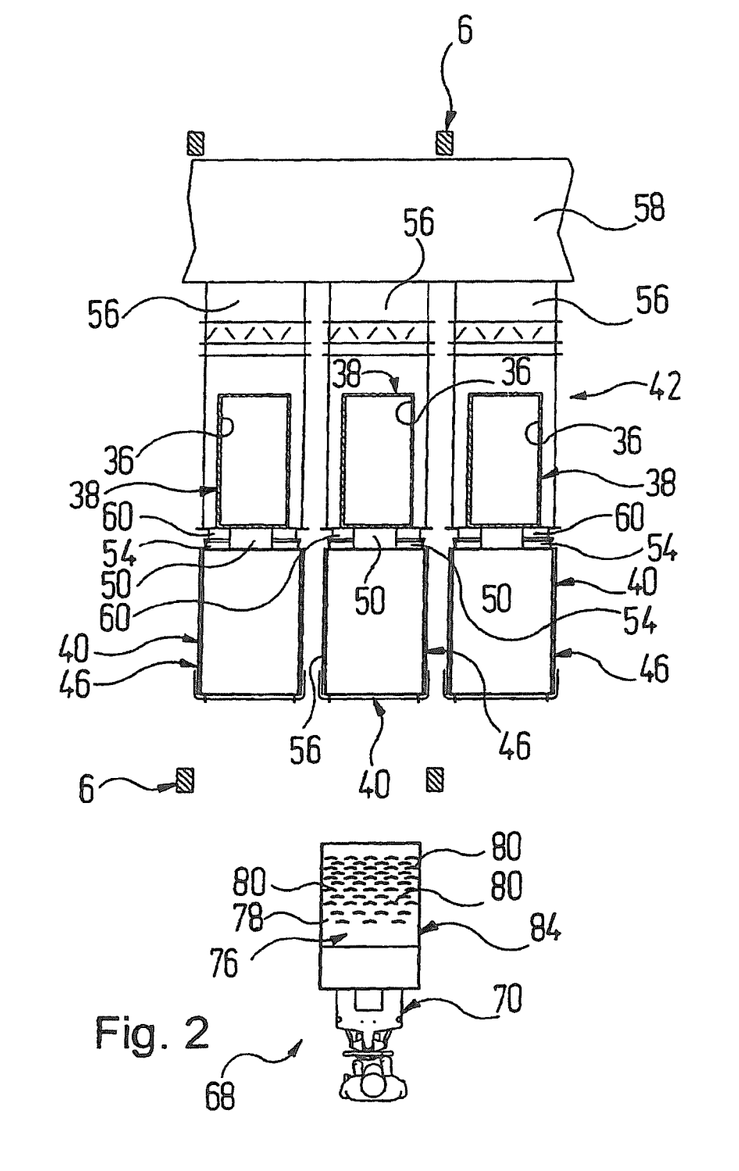
FIG. 2 a partial section through the paint booth of FIG. 1, along the section line II-II shown therein, on an enlarged scale.

The filter plates 80 are V-shaped in cross-section and arranged such that the point of the V faces in the flow direction 74 of the air, in which the booth air flows through the inertial filter 52. The filter plates 80 here are arranged offset from one another, with the number of filter plates 80 increasing in the flow direction 74 of the booth air. In other words, the spacing between the filter plates 80 decreases in the flow direction 74 and in a direction perpendicular thereto, i.e. in the horizontal direction here. This principle is shown in FIG. 2 for a replacement filter module 84 which is shown in vertical section and which will replace a fully-laden filter module 40.

In this way, a flow labyrinth, through which the booth air flows and in which the overspray particles are separated at the filter plates 80 in a manner known per se in accordance with the principle of mass inertia, is formed in the flow direction 74 in the inertial filter 52. From there, the overspray flows downwards into the collecting trough 72 where the overspray accumulates into a paint sump.

Figure 4:
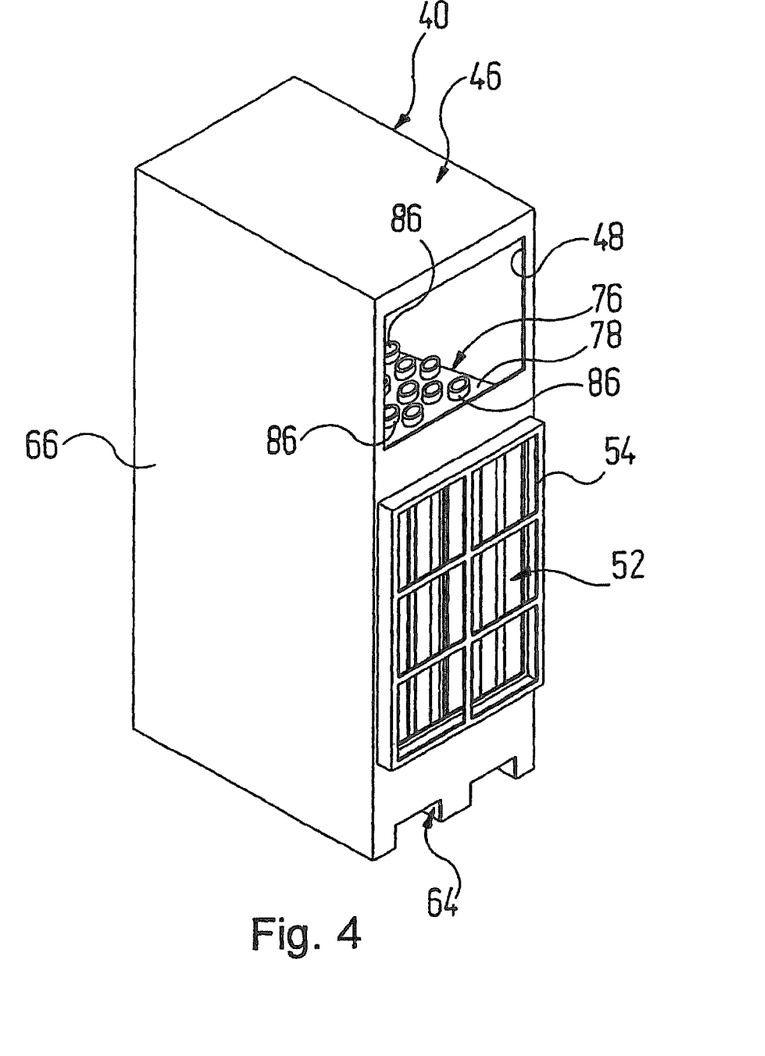
FIG. 4 a perspective view corresponding to FIG. 3 of a modified filter module.

Instead of the filter plates 80, it is also possible to use separating elements which have a different construction in terms of their geometry and dimensions. FIG. 4 shows a modified filter module 40 in which filter cartridges 86 are supported by the supporting plate 78 of the supporting structure 76, instead of the filter plates 80. The filter cartridges 86 here are arranged according to the same principle as the filter plates 80 in the filter module 40 according to FIG. 3. In practice, it is also possible to provide other arrangements of the separating elements.

Instead of the filter plates 80 or filter cartridges 86, it is also possible to provide compartment structures or chamber structures as separating elements. Plates or sheets which are connected to one another in foldable or plug-in manner can serve for example as compartment structures. In practice, chamber structures have a honeycomb-like design.

As can be seen in FIG. 1, the filter module 40 rests on scales 88 in its operating position and is locked in its operating position at the top and bottom by means of a locking device 90.

Each filter module 40 is designed to hold a maximum quantity of paint, i.e. for an overspray loading limit which depends on the type of filter module 40 and the materials used for this. The quantity of paint which has already been collected can be monitored by the scales 88. Alternatively, the loading limit can be established by determining the differential pressure. The air resistance built up by the filter module 40 increases as the filter module 40 becomes more loaded.

When a filter module 40 has reached its maximum holding capacity, the locking device 90 is released, the fully-laden filter module 40 is moved out of the separating region 44 of the paint booth 2 by means of the elevating conveyor 70 and replaced with an empty filter module 40. To this end, the flow connection between the filter module 40 to be replaced and the guide channel 38 and the connecting channel 46 is interrupted in advance in that the channel outlet connection 50 of the guide channel 38 and the inlet flange 60 of the connecting channel 56 are closed by means of a stop valve (not shown specifically).

When the empty filter module 40 is moved into its operating position on the scales 88, it is locked accordingly by the locking device 90 and therefore secured against being inadvertently moved out of the separating region 44. The stop valves of the guide channel 38 and the connecting channel 56 are brought back into an open position so that the booth air flows through the newly positioned filter module 40.

The replaced overspray-laden filter module 40 is then supplied to a disposal and/or recycling process and therefore used as a disposable filter module.

In other words, the filter modules 40 in which overspray is separated are therefore constructed as replaceable disposable units with a filter housing 46 and a filter unit 52, with each filter module 40 being replaced with an empty filter module 40 after reaching an overspray loading limit.

Figure 5:
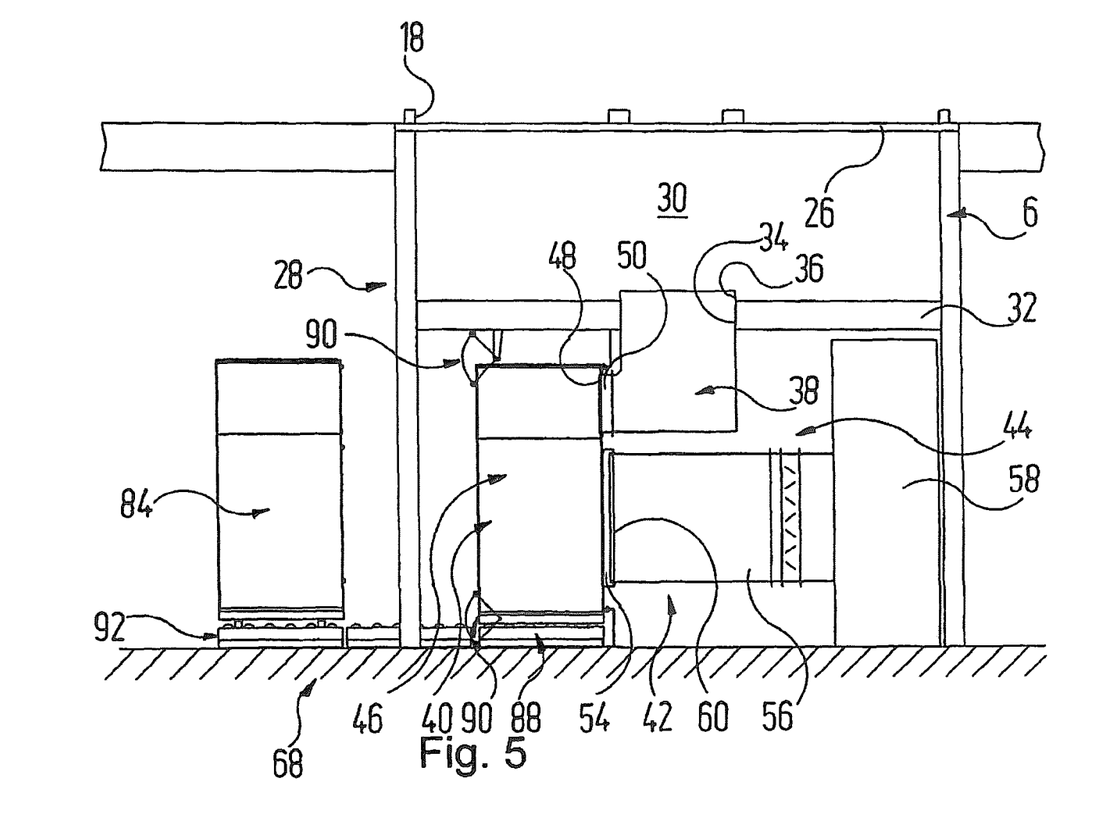
FIG. 5 a view corresponding to FIG. 1 of a modified separating region of the paint booth on an enlarged scale.

FIG. 5 shows a further modified conveyor system 68 as a variation. Instead of an elevating conveyor truck, this shows a roller conveyor system 92, which comprises roller conveyors with motor-driven rollers in a manner known per se. By means of the roller conveyor system 92, filter modules 40 whereof the holding capacity for paint overspray is exhausted can be moved out of the separating region 44 of the paint booth 2 under computer control and replaced with a respective unloaded filter module 40. To this end, the roller conveyor system 92 comprises cooperating conveyor units by means of which filter modules 40 can be moved parallel and/or transversely to the longitudinal extent of the paint booth 2.

The base part 64, the chamber housing 66, the supporting structure 76 and the separating elements 80, 86 of the filter module 40 are made from a wet-strength recycling material. Generally speaking, one component, several components or all the components of the filter module 40 are made from a wet-strength recycling material. Cellulose materials, such as optionally treated paper and paperboard materials, corrugated cardboard, cardboards with vertical corrugations, cardboards with a honeycomb structure or cardboard wrap as well as other materials, such as MDF materials, can be used for this. A wooden Euro pallet is suitable for example as the base part 64. Plastics, particularly such as polyethylene or polypropylene, are also possible.

The filter module 40 here can itself be delivered as a modular kit comprising the said components in individual parts and assembled on site. The chamber housing 66 here can have for example a collapsible ceiling and be folded along two diagonally opposed longitudinal edges into a two-layer housing plate. The unfolded chamber housing 66 is then slipped for example over the inertial filter 52, which has been assembled in advance from the supporting structure 76 and the filter plates 80 or filter cartridges 86.

After the inertial filter 52 has then been mounted on the chamber housing 66, this structural unit is placed on the base part 64 and possibly secured thereto by adhesion.

To construct the collecting trough 72, a sealing mass can be injected into the base region and distributed uniformly in the base region of the flow chamber 62 using a nutating table.

Figure 6:
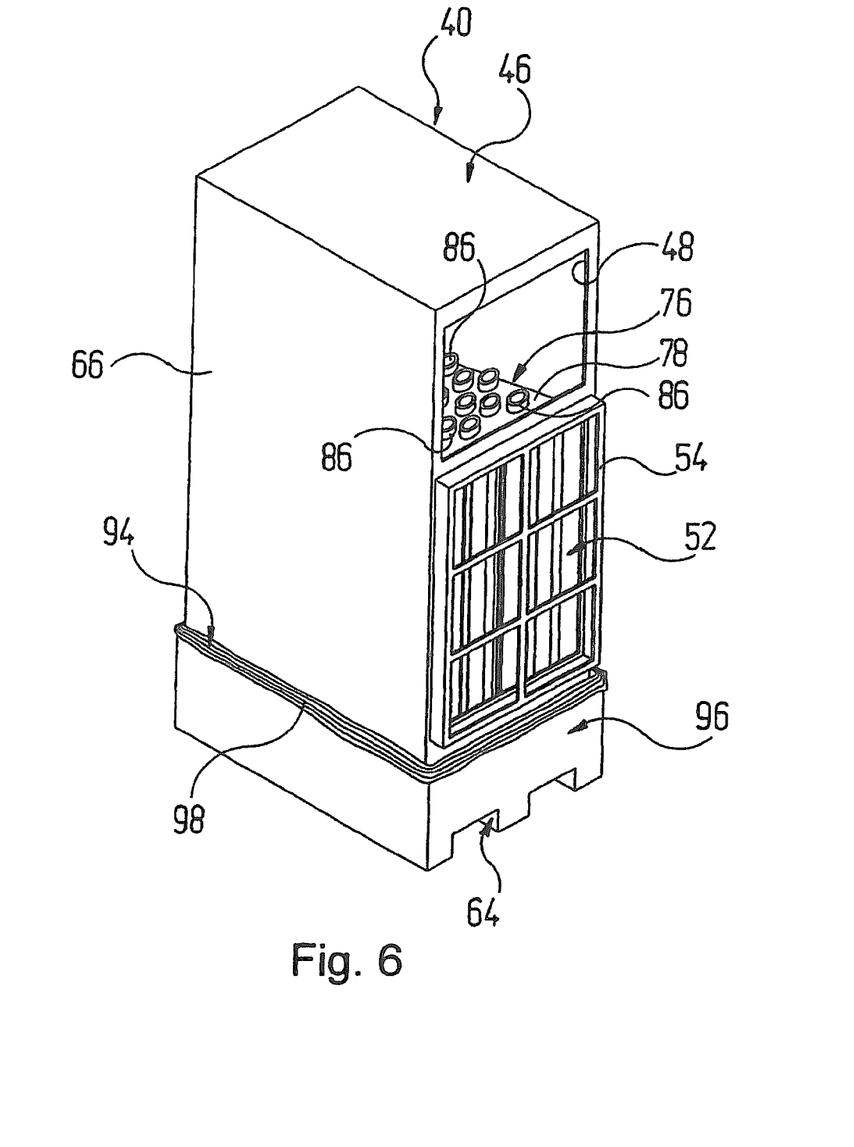
FIG. 6 a view corresponding to FIG. 4 of a filter module which is again modified.
Figure 7:
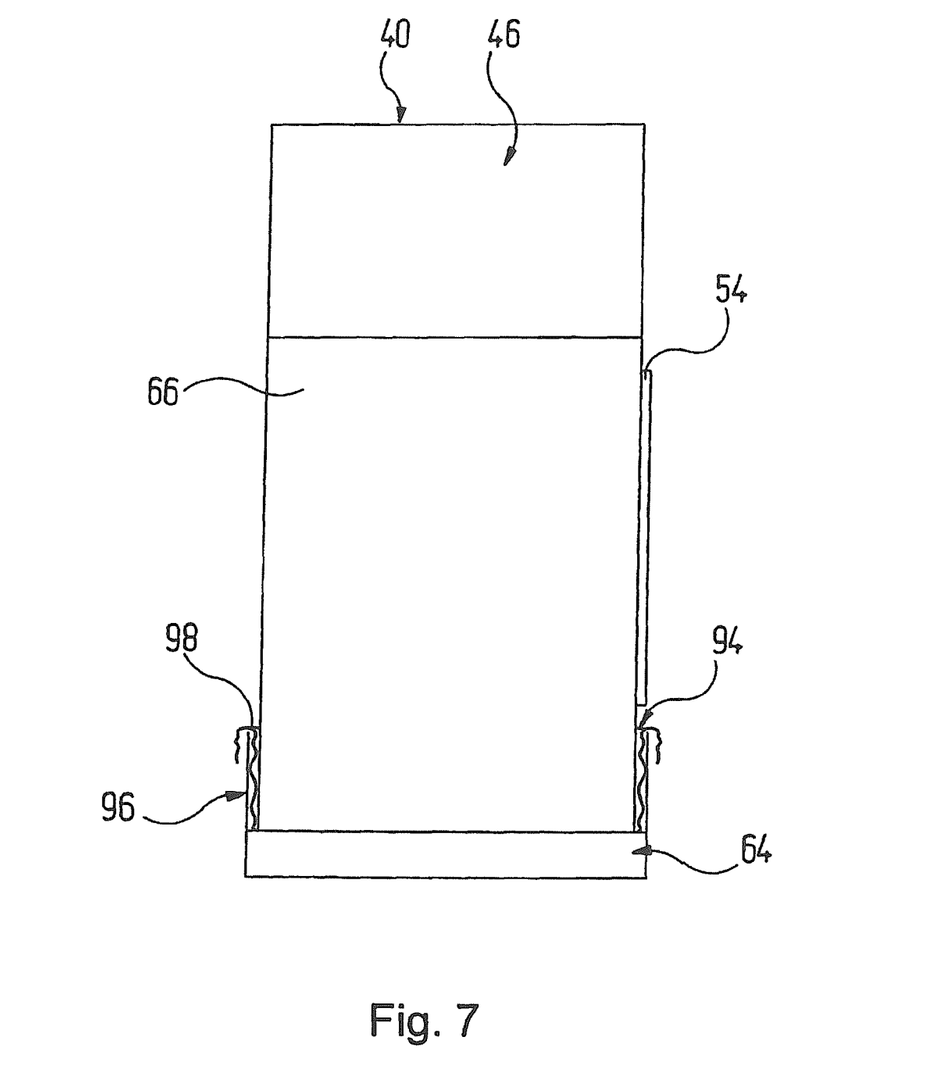
FIG. 7 a side view of the filter module according to FIG. 6, wherein a collecting trough is shown in section.

FIGS. 6 and 7 show an alternative collecting trough 94 to this. Here, the base part 64 supports a rotating trough frame 96, which can likewise be made from one of the above-mentioned wet-strength recycling materials, for example from thin wooden blocks. A liquid-tight collecting bag 98, in which the chamber housing 66 can be placed and whereof the upper edge is folded outwards over the trough frame 96, is inserted into the trough frame 96. It has been shown in practice that so-called Big-Bags can be used as a collecting bag 98, which are known per se as packaging for example for powder paint.

The modular construction of the separating device 42 enables it to be of a compact design such that it can be arranged as an entire device within the inner contour of the paint booth 2, which is created by the steel structure 6 in the present exemplary embodiments. This is clearly shown in FIG. 1. In this way, the surface area required for the paint booth 2 is also not increased by the separating device 42. This enables ready-assembled paint booths to be retrofitted with the separating device 42. This compactness of the separating device 42 as a whole is here based on the compactness of the individual filter modules 40.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for separating overspray from the overspray-laden booth air of coating plants comprising:
   taking up overspray by an air stream and guiding the overspray to a separating device where a majority at least of the solid materials is separated from the overspray,
   wherein the overspray-laden booth air is conducted through filter modules in which the overspray is separated and which are constructed as replaceable disposable components with a filter housing and a filter unit,
   wherein each filter module is replaced with an empty filter module after reaching an overspray loading limit,
   wherein the overspray-laden booth air is guided to each filter module through an air guide channel, and
   each filter housing comprises a filter inlet which is constructed complementary to a channel outlet connection of one air guide channel to place each filter module in fluid communication with one air guide channel.

2. The method according to claim 1, wherein a replaceable and overspray-laden filter module is supplied to a disposal and/or recycling process.

3. The method according to claim 1, wherein an inertial filter is used as the filter unit.

4. A device for separating overspray from the overspray-laden booth air of coating plants comprising:
   a) a separating device which operates using filter modules through which overspray-laden booth air can be conducted and in which overspray is separated;

b) the filter modules are constructed as replaceable disposable units with a filter housing and a filter unit;

c) the separating device includes a device which replaces each filter module with an empty filter module after each filter module reaches an overspray loading limit, d) wherein the overspray-laden booth air is guided to each filter module through an air guide channel, and e) each filter housing comprises a filter inlet which is constructed complementary to a channel outlet connection of one air guide channel to place each filter module in fluid communication with one air guide channel.

5. The device for separating according to claim 4, wherein the filter unit is constructed as an inertial filter.

6. The device for separating according to claim 5, wherein the filter unit comprises a plurality of separating elements which are arranged to form a flow labyrinth.

7. The device for separating according to claim 6, wherein the plurality of separating elements extend vertically and have booth air flowing around them in a horizontal direction.

8. The device for separating according to claim 6, wherein a spacing between the separating elements decreases in a flow direction and/or in a direction which is perpendicular to the flow direction.

9. The device for separating according to claim 6, wherein filter plates, filter cartridges, compartment structures or chamber structures are present as separating elements.

10. The device for separating according to claim 4, wherein each filter module includes a base part constructed as a standardised supporting structure.

11. The device for separating according to claim 4, wherein one component, several components or all the components of the filter module are made from a wet-strength recycling material.

12. The device for separating according to claim 11, wherein one or more of the following materials is selected as the wet-strength recycling material: paper and paperboard materials, corrugated cardboard, cardboards with a vertical corrugation, cardboards with a honeycomb structure or cardboard wrap, MDF material, wood or plastic materials, polyethylene or polypropylene.

13. The device for separating according to claim 4, wherein the filter module is constructed as a modular kit.

14. The device for separating according to claim 4, wherein the filter module includes a collecting trough in which separated overspray collects.

15. The device for separating according to claim 14, wherein the collecting trough includes a collecting bag which is arranged on a base of the filter module.

16. A plant for coating objects comprising:
a) a coating booth, in which objects can be acted upon by coating material and through which an air stream can be conducted, and which takes up and carries away overspray produced from the coating material;
b) a device for separating to which this booth air can be supplied and where a majority at least of the solid materials is separated from the overspray,
c) wherein the device for separating is constructed according to claim 4.

* * * * *